UNITED STATES PATENT OFFICE.

WILHELM HERZBERG AND OTTO SIEBERT, OF BERLIN, GERMANY, ASSIGNORS TO ACTIEN GESELLSCHAFT FÜR ANILIN FABRIKATION OF BERLIN, GERMANY.

MONOAZO DYE AND PROCESS OF MAKING SAME.

No. 803,592.        Specification of Letters Patent.        Patented Nov. 7, 1905.

Application filed February 25, 1904. Serial No. 195,224. (Specimens.)

*To all whom it may concern:*

Be it known that we, WILHELM HERZBERG and OTTO SIEBERT, of Berlin, in the Kingdom of Prussia, German Empire, have invented new and useful Improvements in Monoazo Dyes and Processes of Making the Same; and we do hereby declare that the following is a full, clear, and exact description thereof, which will enable others skilled in the art to which it appertains to make and use the same.

It is well known that mordants dyeing monoazo dyestuffs are obtained by combining the diazo compound of ortho-amidophenol with phenols, amidophenols, amins, diamins, or the sulfonic or carboxylic acids thereof. Mordants dyeing coloring-matters of the same kind are also described in literature which contain in the benzol nucleus of the ortho-amidophenol certain substitutes—as, for instance, chlorin, methylnitro, or sulfo group.

Now our invention relates to the manufacture of new azo dyestuffs of the following formula:

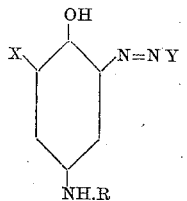

in which X represents hydrogen, chlorin, the sulfonic or carboxylic group, Y a naphthol compound, and R stands for hydrogen or an alkyl group, such as the methyl, ethyl group, &c.

By "naphthol compounds" we understand, besides naphthol itself, such derivatives thereof as contain a second hydroxyl group or a sulfonic group.

As is shown by the above formula, the dyestuffs contain the group NH.R—that is to say, either a free amido group or an amido group in which only one hydrogen atom is substituted. It is obviously due to the presence of the amido-hydrogen, which affords a point of attack for the oxidizing agent, that the dyes obtained by means of these coloring-matters are converted by such oxidizing agents as chromium compounds into valuable dark shades of an extraordinary fastness against milling and "potting."

For carrying out our invention we proceed, for instance, as follows, the parts being by weight: 24.6 parts of acetyl-para-amido-ortho-amidophenol-ortho-sulfonic acid, having the formula

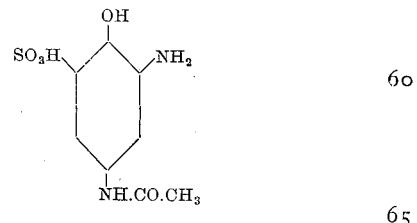

are dissolved in water with addition of the required quantity of sodium carbonate and then diazotized in the usual manner by means of 6.9 parts of sodium nitrite and hydrochloric acid. The diazo solution thus produced is slowly run while stirring into a mixture of fifteen parts of beta-naphthol, caustic-soda lye, and such a quantity of soda-lye as to produce an alkaline solution up to the end of the reaction. After stirring for about six hours the precipitation of the dyestuffs is completed by adding common salt. The dyestuff obtained is boiled during several hours in a vessel provided with a reflux condenser with fifty parts of sulfuric acid of five-per-cent. strength in order to eliminate the acetyl-group. The dyestuff is then filtered off, dissolved in diluted soda-lye, precipitated by adding common salt, filtered, and dried. The new coloring-matter thus obtained is in the shape of the sodium salt when dry and pulverized a black powder soluble in water to a Bordeaux-red solution, which on addition of hydrochloric acid turns to a red coloration, whereas the addition of caustic soda effects a pure blue solution. It is soluble in concentrated sulfuric acid of 66° Baumé to a red-violet solution, separating by the addition of ice a brown-red precipitate.

The coloring-matter dyes wool brown-red shades, which by subsequent treatment with chromates, bichromates, and the like, acting as oxidizing agents, are changed to black, distinguished by a very great fastness to washing, milling, potting, and the action of light.

It will be clear to those who are familiar with the manufacture of azo dyestuffs that many departures may be made from the details of the specific example illustrated and described by us, the essentials of the invention still being present. We therefore do not limit ourselves to such details nor to the said specific example.

Having now described our invention and in what manner the same is to be performed, what we claim is—

1. The herein-described process of manufacturing new azo coloring-matters by combining with a naphthol compound the diazo compound of a hereinbefore-defined derivative of the ortho-amidophenol, having in the para position to the OH group the group NH.R, R meaning an alkyl group, and in the ortho position to the OH group a hydrogen atom, chlorin, the sulfonic or carboxylic group.

2. As new products the azo coloring-matters deriving from the diazo compound of a hereinbefore-defined derivative of the ortho-amidophenol and obtained by the combination of such a diazo compound with a naphthol compound; these coloring-matters being in the shape of the sodium salt brown to black powders, soluble in water with a red to Bordeaux-red coloration, turning to blue by the addition of caustic-soda lye, soluble in concentrated sulfuric acid of 66° with a violet coloration, which solution is partly precipitated by the addition of ice, the precipitation having a yellow-red to brown-red coloration; dyeing wool from an acid-bath brown-red shades, which are changed to a deep black by a subsequent treatment with oxidizing chromium compounds, these shades being distinguished by a very great fastness to washing, milling, potting and the action of light.

3. As a new product the coloring-matter derived from para-amido-ortho-amidophenol-ortho-sulfonic acid and beta-naphthol, which in the shape of the sodium salt is a black powder, soluble in water with a Bordeaux-red coloration turning to pure blue by addition of caustic-soda lye, soluble in concentrated sulfuric acid of 66° with a red-violet coloration which separates a brown-red precipitation by the addition of ice; dyeing wool from an acid-bath brown-red shades which are changed to a deep black by a subsequent treatment with chromium compounds, acting as oxidizing agents, substantially as described.

In witness whereof we have hereunto signed our names, this 5th day of February, 1904, in the presence of two subscribing witnesses.

WILHELM HERZBERG.
OTTO SIEBERT.

Witnesses:
HENRY HASPER,
WOLDEMAR HAUPT.